March 6, 1962  E. BIGEAULT  3,024,340
SYSTEM FOR ELECTRICALLY HEATING PREMISES
Filed Jan. 15, 1960  4 Sheets-Sheet 1
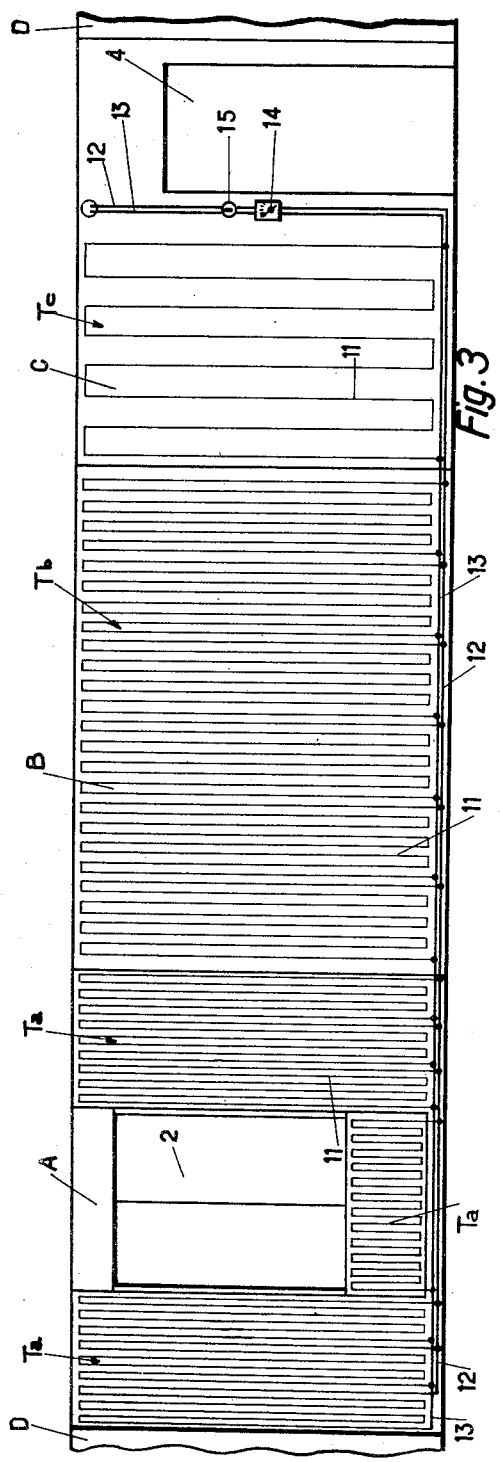
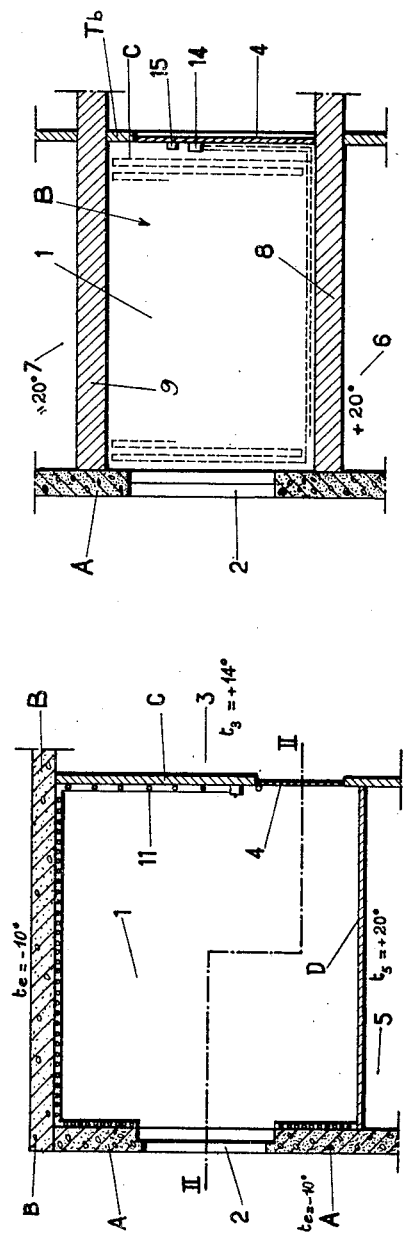
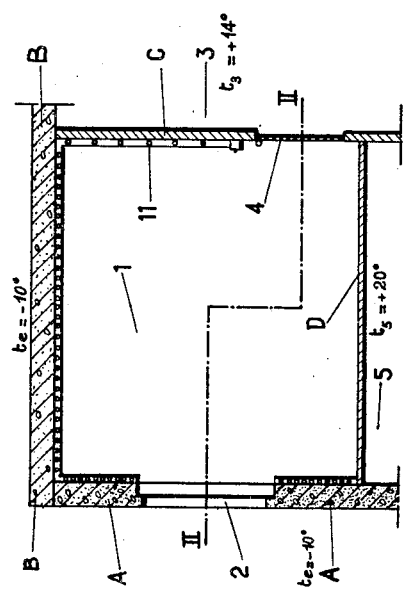
INVENTOR
EMILE BIGEAULT
By Irwin J. Thompson
ATTY.

March 6, 1962 E. BIGEAULT 3,024,340
SYSTEM FOR ELECTRICALLY HEATING PREMISES
Filed Jan. 15, 1960 4 Sheets-Sheet 2
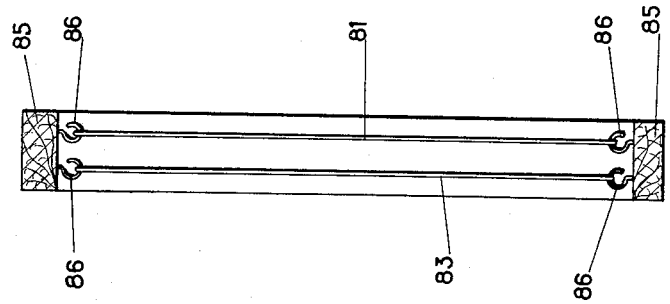
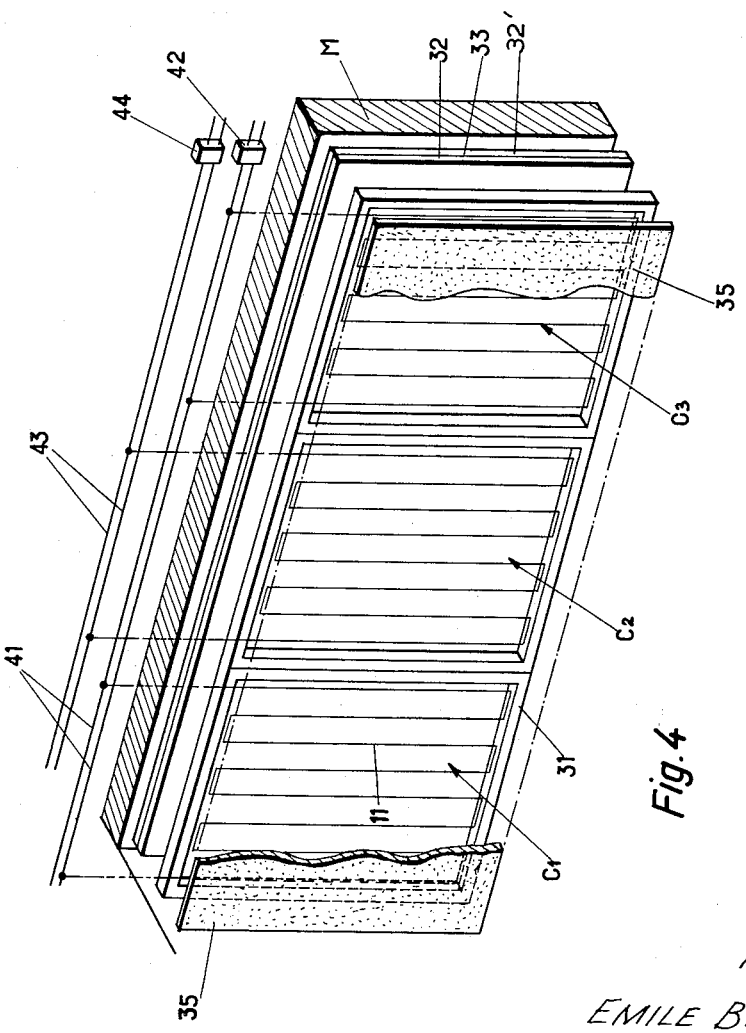
INVENTOR
EMILE BIGEAULT
By Irwin S. Thompson
ATTY.

March 6, 1962  E. BIGEAULT  3,024,340
SYSTEM FOR ELECTRICALLY HEATING PREMISES
Filed Jan. 15, 1960  4 Sheets-Sheet 3

INVENTOR.
EMILE BIGEAULT
BY Irwin S. Thompson
ATTY.

March 6, 1962
E. BIGEAULT
3,024,340
SYSTEM FOR ELECTRICALLY HEATING PREMISES
Filed Jan. 15, 1960
4 Sheets-Sheet 4
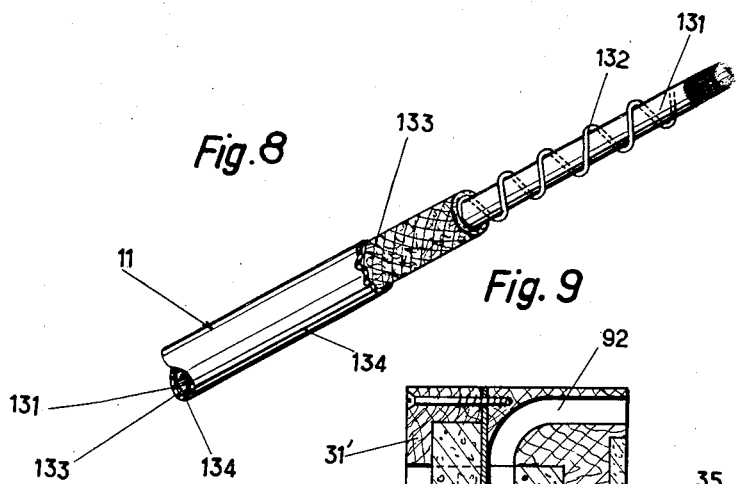
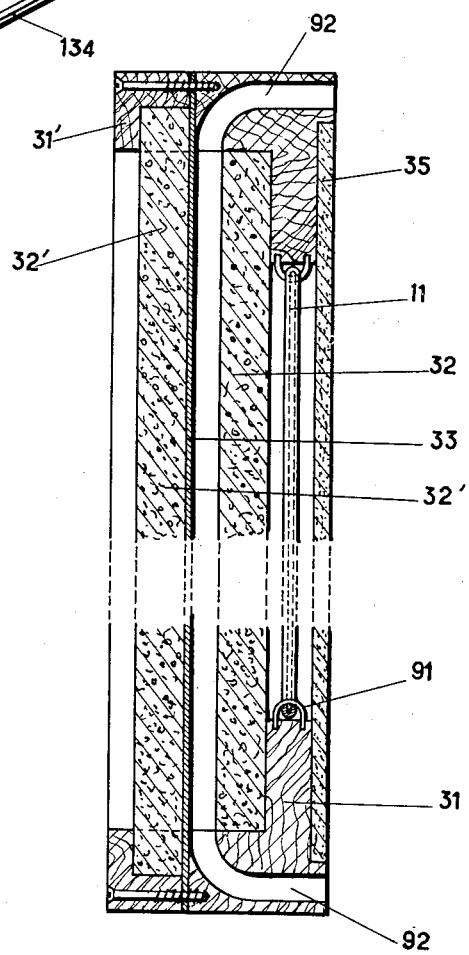
INVENTOR
EMILE BIGEAULT
By Irwin S. Thompson.
ATTY.

United States Patent Office 3,024,340
Patented Mar. 6, 1962

3,024,340
SYSTEM FOR ELECTRICALLY HEATING
PREMISES
Emile Bigeault, 55 Rue Jouffroy, Paris, France
Filed Jan. 15, 1960, Ser. No. 2,615
3 Claims. (Cl. 219—19)

It is known to ensure the heating of premises such as offices, dwelling places and the like by arranging within the ground or the walls piping means wherein a hot fluid is circulated. When being thus heated, the walls in the premises radiate infra-red rays which in turn warm up the persons present in the place.

This heating system is highly healthy and comfortable, but has to be put into place when the building is erected. It has the drawback that a considerable thermal inertia is involved, so that it is impossible to adapt the heat supply to the hourly changes in the outside temperature, which results in a poor thermal efficiency.

It is known also to provide an infra-red ray heating system by using electric energy. In this type of heating system, the radiation sources usually consist of red-hot electric resistances which supply a relatively dense infrared beam.

For this reason, the last-mentioned system, while affording the advantage of involving but a low thermal inertia, is only suitable for providing an additional or closely localized heating.

One of the objects of the present invention is to remedy the above drawbacks by allowing entire premises to be heated by an infra-red radiation of electric origin, while keeping the current consumption low enough to make the device competitive.

This invention provides a method and an equipment wherein the heating means used consist of heating wefts arranged along the walls of the premises. The term "heating weft" refers to a set of electrically resistive wires which are suitably insulated and are in operation, heated to a relatively low temperature, said wires being, for example, arranged in parallel, short-spaced relationship.

The method according to the invention essentially consists in determining, for at least part of the walls bounding the premises, the thermal loss on the total surface area of the relevant wall and in equipping the area available on this wall with heating wefts having a low thermal inertia, consisting of at least one spread of electrically resistive wires, tightened in parallel relationship over a frame, and to cause said wefts to radiate an amount of thermal power proportioned to the heat loss occurring over the entire wall.

Preferably, the thermal power liable to be radiated through the wefts provided on the surface area available on a wall is proportional to the whole thermal loss obtained by adding the proper loss of the whole area of the relevant wall with the fraction of losses ascribable to said wall as a result, on the one hand, of the losses over the non-equipped walls in the premises (such as the floor or ceiling) and, on the other hand, of the losses affecting the whole premises (notably due to the air infiltrations).

The invention further provides an equipment for electrically heating premises through the walls thereof, said equipment being characterized in that, for at least part of the walls of the premises, the available surface area is equipped with heating wefts consisting of at least one spread of electrically resistive wires, tightened over a frame and heated in operation to a relatively low temperature, the thermal power liable to be radiated by each of said wefts being moreover proportioned to the thermal loss over the premises wall to which said weft is adjacent.

The various circuits consisting of the heating wefts in the premises may be grouped into networks, each of said networks being under the control of at least one thermostat. A simple, economical equipment may thus be provided affording a wide range of heating rates, so as to precisely comply with the premises requirements, taking into account the outside conditions and the losses in the particular premises to be heated.

Other characteristics of the invention will further result from the following description.

In the accompanying drawings, given by way of non-restrictive examples:

FIG. 1 is a plane sectional view of premises walls equipped according to the invention.

FIG. 2 is a vertical section of the same premises, taken along II—II of FIG. 1.

FIG. 3 is a developed view on an enlarged scale, some portions being broken away to show the weft distribution on the premises walls, after the wire-hiding surface has been removed.

FIG. 4 is a diagrammatic perspective view with portions broken away, showing a practical embodiment of a heating wall according to the invention.

FIG. 7 is a cross-sectional view of a frame equipped according to FIG. 6.

FIG. 8 is a perspective view, with parts broken away, showing on a much enlarged scale a heating wire.

FIG. 9 is an elevational cross-sectional view of a heating weft-carrying frame.

FIGS. 1 to 3 illustrate the method according to the invention as applied to given premises.

Figure 5:
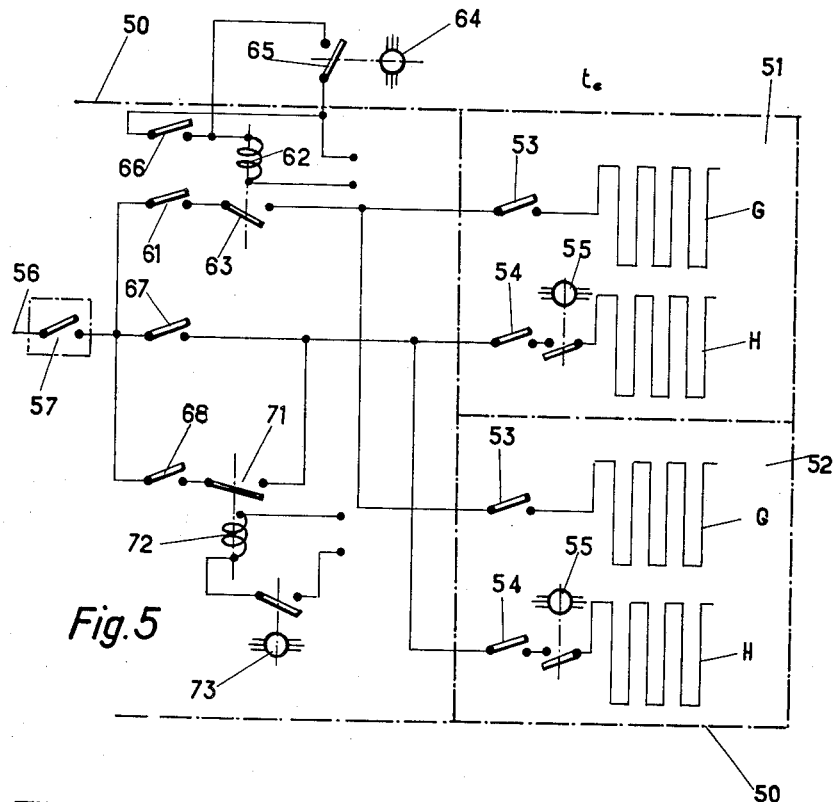
FIG. 5 is an electric wiring diagram of a particular equipment.

In the example under consideration, it has been assumed that said premises consist of a room comprising a front wall A with a window 2, a cross-wall B without window, a wall C separating room 1 from a lobby 3 and provided with a door 4, and another wall D separating room 1 from a second room 5.

In order to afford a more precise understanding of the practical application of the invention, the example described has been ciphered.

The temperature to be obtained inside the premises 1 is assumed to be $t_1 = +20°$ C. when the outside temperature is $t_e = -10°$ C., the room temperature being supposed to be $t_3 = +14°$ C. in room 3 and $t_5 = +20°$ C. in room 5.

Assumption will further be made that room 1 is located between rooms 6 and 7 (FIG. 2) of the lower and upper floors and that both such rooms are at a $+20°$ C. temperature.

In the example described, it has been chosen to provide heating wefts over the walls A, B and C, with the exclusion of wall D, of the floor 8 and of the ceiling 9.

According to the invention, the maximum thermal power to be radiated by the heating wefts arranged on the surface areas available on walls A, B and C should be proportioned to the loss over the total surface area of the room.

For calculating such power, account has first to be taken of the loss inherent to the particular material of which the wall is made. Such loss is defined by the heat transmission coefficient K.

In the considered example K is supposed to be 2.2 for wall A, except window 2 where $K=6$. For wall B, $K=2$, for wall C, $K=1.2$, except door 4 where $K=3$, and for wall D, $K=1.2$.

For the different thus defined surface areas, the hourly thermal flow F is given by the formula:

$$F = K.S.(t_1 - t_e)$$

where S designates the surface area of the wall, wherefor coefficient K has a given value.

The particular thermal losses over walls A, B and C may thus be calculated, the losses over the other walls being assumed to be zero.

According to the invention, for walls A and C, whereon the area available for the setting of the heating wefts is smaller than the entire wall area, the previously calculated thermal losses are reckoned as applied to the available surface area.

Moreover, said losses are proportionally added with the thermal loss due to cold air infiltrations into the room through the door and window.

Under these conditions, simple calculations lead to the following loss values:

| Wall: | Loss (Calories/hour or watts/hour). |
|---|---|
| A | $Q_a$=1,150 c./h.=1,330 w./h. |
| B | $Q_b$=865 c./h.=1,000 w./h. |
| C | $Q_c$=120 c./h.=140 w./h. |
| D | $Q_d$=0 |

According to the invention, walls A, B, C will be equipped with heating wefts $T_a$, $T_b$, $T_c$ whereof the maximum hourly radiating power in the case of a —10° C. outside temperature should be $Q_a$, $Q_b$, $Q_c$, respectively, and said wefts should moreover afford such even heat distribution as required for ensuring the desirable comfort to the persons present in the room.

The term weft is used to designate one or several spreads of electrically resistive wires, spread over the whole height of the surface area available on the wall.

The practical construction of said wefts will be described hereinunder. It should just be mentioned here that each weft may consist of a continuous resistive wire 11, arranged according to a fretwork pattern along the whole height of the wall (FIG. 3).

The weft on each wall is spread over the entire wall area (weft $T_b$ on wall B) or over the available area (weft $T_c$ on wall C, on the left-hand side of door 4, and weft $T_a$ on wall A, consisting of two portions on either side of window 2).

In each weft, the resistive wire 11 may be distributed in one or several circuits connected in parallel between supply conductors 12, 13 and in series with an adjustable thermostat 14 and a hand-switch 15.

For calculating the practical data of the installation, a certain number of parameters should be taken into account, such as the length of the resistive wire, the relative spacing between the wires, the wire resistance per linear unit or the amount of heat radiated by the wire per linear unit, the number of identical, parallel-connected circuits, etc.

The purpose of the calculations given hereunder is to show how these various parameters may be practically varied for designing an installation complying with the precise adaptability requirements set up by the invention.

*Ciphering of Weft $T_a$*

The available area between 6.10 m.², the thermal radiation per square meter should be:

$$Q_a/6.10 = 1,330/6.10 = 220 \text{ w.m.}^2$$

With a resistive wire radiating 11 w./m. under 220 volts, the wire length per square meter of area should be:

220/11=20 m., which corresponds to a 5 cm.-spacing between the wires.

The wire length for weft $T_a$ should thus be:

$$20 \times 6.10 = 122 \text{ m.}$$

The characteristics of the wire and the number of circuits to be connected may be determined by taking into account that the amperage along all of the circuits is:

$$1.330 \text{ w.}/220 \text{ v.} = 6.10 \text{ Amp.}$$

Where the recommended amperage for the wire to be used is 0.9 A, it will be appreciated that with 7 circuits, the resulting amperage per circuit is:

6.10/7=0.87 A, which is admissible

This leads to a wire length in each circuit of:

$$122/7 = 17.5 \text{ m.}$$

The resistance $r$ of the wire per linear unit may be readily calculated, known the power per unit 11 w./m. and the amperage 0.87 A.

There is thus found:

$$r = 11/0.87 \times 0.87 = 15 \text{ ohms/m. (approximately)}$$

In conclusion, wall A will be equipped with wire having a 15 ohms/m. resistance, said wire being distributed over 7 parallel-connected circuits, each circuit being 17.5 m. long and the wire spacing being 5 cm., six circuits spreading along the walls on either side of the window and one circuit along the window-edging panel.

The seven relevant circuits have been shown in FIG. 3.

*Ciphering of Weft $T_b$*

Wall B having a 10 m.², wholly available surface area, the thermal radiation per square meter should be:

$$Q_b/10 = 100 \text{ w./m.}^2$$

Although the above method is still valid, another method will be used for ciphering the circuits with a view to evidence the ready adaptability of the installation.

If six distinct circuits are to be arranged on wall B, since the total amperage under a 220 volts voltage is:

$$1,000/220 = 4.55 \text{ Amp.}$$

the individual amperage for each circuit is: 4.55/6=0.76 A.

With a wire having a 15 ohms/m. unitary resistance (same value as for the wire on wall A), the thermal radiation per linear unit is:

$$15 \times 0.76 \times 0.76 = 8.6 \text{ watts/m.}$$

The wire length to be laid along each square meter of surface area is then:

$$100/8.6 = 11.6 \text{ m.}$$

and it is clear that the spacing between the wires is:

$$100/11.6 = 8.6 \text{ cm.}$$

A weft made of six circuits using 116 meters of wire with a 8.6 cm. spacing between the parallel wire lengths is shown in FIG. 3.

*Ciphering of weft $T_c$*

Given that the available surface area is only 5 m.², the thermal radiation per square meter is:

$$Q_c/5 = 28 \text{ w./m.}^2$$

A third possible ciphering method will now be applied by assuming a priori that the wire spacing is to be 20 cm. It is then necessary to use 5 wires per square meter and the unitary radiation of the wire should be:

28/5=5.6 w./m., which corresponds to a wire length of:

$$140/5.6 = 25 \text{ meters}$$

Now, since the current amperage is:

$$140/220 = 0.64 \text{ A.}$$

the unitary wire resistance should be:

$$5.6 \text{ w./m.}/0.64 \times 0.65 \text{ A.} = 13.5 \text{ ohms/m.}$$

The circuit ciphering is thus fully determined.

By the above detailed example, it has been evidenced that the heating wefts characteristics may be precisely adapted to the thermal losses in the walls, by moreover presetting such particular parameter as may be deemed convenient.

It is of course possible, within any individual weft, to vary the spacing between the wires either in the same or in different circuits, according as the amount of heat radiated at the surface of some portion of the wall is to be increased or reduced.

FIG. 4 shows an embodiment of the equipment for a wall M using three circuits $C_1$, $C_2$, $C_3$.

The heating wires 11 in each circuit may advantageously have the structure shown on FIG. 8. A resistive wire 132 having a very low or zero heat expansion coefficient, such as constantan is helically wound with some spacing between the turns around a core 131 made of spun or wire-drawn mineral material having good heat-resisting properties. The helical winding 132 is coated with a thin insulating sheath 133, also made of woven mineral material, such as a braid of glass fibers or mineral wool. Sheath 133 is covered by immersion with a flexible insulating coating 134, made for example of chlorated rubber, synthetic rubber containing silicone or other flexible, heat-resisting material.

In operation, the temperature of the resistive wire 132 may be for example 100° C. and that of the coating 134 may be 50° C.

The insulated wire obtained as mentioned before is tightened (FIGS. 4 and 9) over adjacent frames 31 and secured thereto, for example by means of hoops 91. Behind the wires 11 is a partition 32 made of a heat-insulating material (for example a plate made of glass tissue or of a cellular plastic material), a reflecting plate 33 such as a polished metal sheet and a second insulating partition 32', similar to 32, supported by a frame 31' secured to the frame 31. The frames 31, 31' preferably extend along the whole height of the wall.

Arranged before said frames is an external panel 35, made for example of wall-paper, synthetic fabric, painted metal sheet or of a plastic material plate. Said panel acts as a secondary radiating and as a diffusing means for the infra-red rays emitted by the wires 11.

The frames 31 may be so designed as moreover to create convection drafts by means of air circulating channels 92 opening onto the room. Such a structure is very light and has a very low thermal interia.

While the various circuits $C_1$, $C_2$, $C_3$ may be fed through the same conductors and controlled by a single thermostat, as in the installation shown in FIG. 3, provision is still made by the invention of turning into account the division into different circuits for establishing in a same room or same premises various networks having distinct control means.

Thus in the case of FIG. 4, circuits $C_1$, $C_3$ are fed through conductors 41, controlled by thermostat 42, whereas circuit $C_2$ is fed through conductor 43 controlled by thermostat 44, it being understood that each thermostat may be associated with a branched off circuit provided with a switch whereby said thermostat may be short-circuited, so as to ensure a continuous operation.

In FIG. 4, the connections have been, for clarity sake, separated from the circuits $C_1$, $C_2$, $C_3$, but it is clear that in practise both feeding conductors 41, 43 are comprised in the same mains, housed within the plinth or the ceiling.

The thermostat 42 may be located outside the premises to automatically start the circuits $C_1$, $C_3$ upon any drop of the outside temperature below a predetermined value, whereas the thermostat 43 is located inside the premises to supply an additional heating through circuit $C_3$.

Owing to the distribution of the heating wefts in circuits, with the use of several networks and by means of judiciously arranged thermostats and switching means, installations may be very simply designed, affording a compliance in operation which cannot possibly be obtained with the usual electric heating means, such as radiators.

A single-wire illustration of such an installation is given in FIG. 5, where 51 and 52 are two rooms in the premises to be heated, whereof the outer walls are diagrammatically shown at 50.

In each room, the various heating circuits cluster in two networks symbolically shown at G and H, which are controlled by independent hand-switches 53, 54, one of said networks, H, being moreover controlled by a room thermostat 55 located inside the relevant premises.

Provided in addition to these local control devices is a power control affording multiple combinations and including, from the feeding section 56 and the circuit-breaker 57, two control circuits for networks G and H respectively.

The circuit controlling network G comprises, after the main switch 61, a contact unit 62 actuating contact 63 connected in series with circuit breaker 61.

Contact unit 62 may be controlled either by a thermostat 64, located outside the premises and subjected to temperature $t_e$, which actuates a contact 65, or by a hand-switch 66.

The circuit controlling network H comprises in parallel with a hand-switch 67 a circuit comprising a switch 68 and a contact 71 of a contact unit 72, in turn controlled by a thermostat 73, located in a pilot room and set to the minimum night temperature so as to ensure a minimum general temperature.

With an installation of this type, various heating rates may be provided as follows:

*Normal day-operation.*—Switches 61 and 67 closed, 66 and 68 open.

Network G is under the control of the outside thermostat 64. In fact, should the outside temperature drop below the predetermined value, then contact 65 will close, thereby energizing contact unit 62 which closes contact 63, the resistances in network G being thus fed with current.

Network H is under the control of each local thermostat 55 which feeds current to the relevant resistances if the ambient temperature is below the predetermined value. The H network circuits in each room are thus under alternate on-and-off operating conditions, thus providing an additional heating.

*Night Operation*

(a) Outside temperatures over —7° C. for example. Switches 66, 61, 67 are open and switch 68 is closed.

Network G is disconnected from the circuit.

Network H is under the control of thermostat 73. It will be switched on if the temperature in the pilot room drops below the prescribed value.

(b) Outside temperatures below —7° C. Switches 61, 66 and 68 are closed, 67 remains open.

Network G is permanently on.

Network H supplies the required additional heat under the control of thermostat 73 in the pilot room.

*Switching to Morning Operation*

Switches 66, 61, 67 are closed and switch 68 is open. Networks G are operating continuously, whereas the operation of networks H is regulated by the room thermostats 55.

After the required time interval, the normal day operation may be restored by opening contact 66.

Such an installation, providing operating conditions which oscillate between several predetermined heating rates, imparts a remarkably improved feeling of comfort to the persons present in the premises.

In the practical embodiment of the invention and especially in the case where the heating circuits are distributed in several networks, an imbricate arrangement of the heating wires in two distinct circuits may advantageously be provided.

Figure 6:
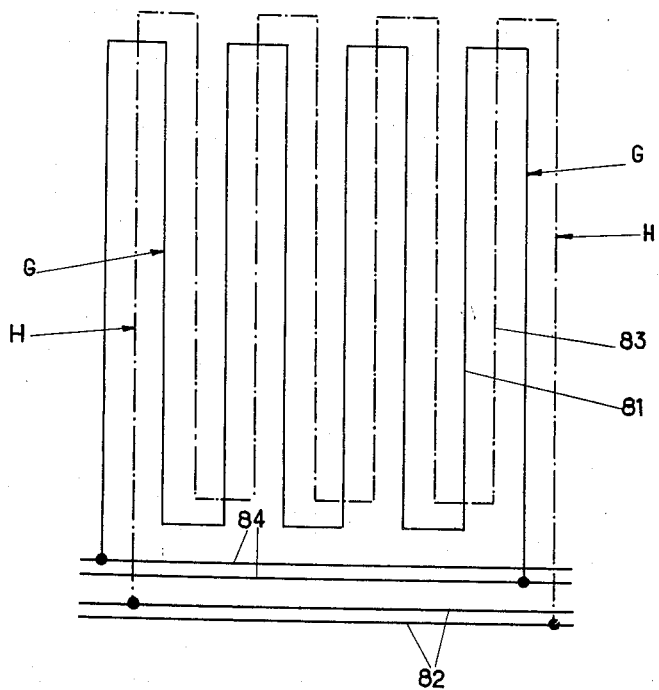
FIG. 6 shows diagrammatically a weft comprising two imbricated circuits.

Such an arrangement is shown in FIG. 6, where the resistive wires 81 fed through conductors 84 are comprised in a first network G, whereas the wires 83 fed by the conductors 82 are comprised in a second network H. In projection, wires 83 are equidistant from wires 81.

In a practical embodiment (FIG. 7), wires 81, 83 may be tightened over a common frame 85 by means of hooks 86 so as to provide two evenly spaced spreads of wires.

Such a structure avoids the formation of hot points resulting from any contact between two resistive wires as would happen at the cross-points, if the two wire spreads were co-planar.

With such a wiring arrangement, heat may be evenly radiated over the entire wall surface area; only the rate of surface heat radiation is varying according to the way in which current is fed to the networks.

What I claim is:

1. A system for electrically heating premises bounded by a plurality of walls, each having definite thermal losses relevant to the whole area of the same, said system comprising an assembly of heating wefts of low thermal inertia mounted on at least an available area of said walls, each of said wefts consisting of a frame, a serpentine threading of electrically resistive wires tightly mounted within said frame, two independent heating networks provided within said premises, one of said networks comprising a part of said resistive wires of said wefts and the other network comprising the remaining part, means to energize said networks, and independent controlling means for independently controlling the energizing of said networks, one of said controlling means comprising a thermostatic switch located outside said premises, the other one of said controlling means comprising a thermostatic switch located inside said premises so that a heating power is radiated per square unit by said wefts of said networks and wherein said heating power radiated by said wefts of one of the walls is proportioned to said thermal losses relevant to said wall.

2. A system for electrically heating premises according to claim 1, wherein each heating weft comprises two separate circuits respectively connected to said networks, each of said circuits comprising a serpentine threading of heating wires tightly mounted within said frame.

3. A system for electrically heating premises according to claim 2, and wherein each of said circuits comprises for each heating weft a serpentine threading of heating wires tightly mounted within a common frame, each serpentine threading of heating wires arranged in parallel planes, and both serpentine threading of heating wires having an imbricate arrangement when said planes are viewed in projection.

References Cited in the file of this patent
UNITED STATES PATENTS

| | | |
|---|---|---|
| 2,042,742 | Taylor | June 2, 1936 |
| 2,503,601 | Tice | Apr. 11, 1950 |
| 2,511,378 | Roberson | June 13, 1950 |
| 2,521,540 | Richardson | Sept. 5, 1950 |
| 2,613,306 | Waltersdorf et al. | Oct. 7, 1952 |